(12) United States Patent
Agarwal

(10) Patent No.: US 10,389,656 B2
(45) Date of Patent: Aug. 20, 2019

(54) DETERMINING PORT-TO-PORT CONNECTIVITY IN AN EXTENDED BRIDGE

(71) Applicant: ARRIS Enterprises LLC, Suwanee, GA (US)

(72) Inventor: Bipin Agarwal, San Jose, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 19 days.

(21) Appl. No.: 15/595,747

(22) Filed: May 15, 2017

(65) Prior Publication Data

US 2018/0069808 A1    Mar. 8, 2018

Related U.S. Application Data

(60) Provisional application No. 62/384,621, filed on Sep. 7, 2016.

(51) Int. Cl.
| | |
|---|---|
| *H04L 12/937* | (2013.01) |
| *H04L 29/08* | (2006.01) |
| *H04L 29/06* | (2006.01) |
| *G06F 16/2455* | (2019.01) |

(52) U.S. Cl.
CPC ...... *H04L 49/253* (2013.01); *G06F 16/24568* (2019.01); *H04L 69/22* (2013.01); *H04L 69/324* (2013.01); *Y02D 30/30* (2018.01)

(58) Field of Classification Search
CPC .. H04L 49/253; H04L 69/22; G06F 17/30516
See application file for complete search history.

(56) References Cited

U.S. PATENT DOCUMENTS

| | | | |
|---|---|---|---|
| 6,950,855 B2 | 9/2005 | Sampathkumar | |
| 7,558,835 B1 | 7/2009 | Shafer | |
| 7,675,869 B1 | 3/2010 | Anker et al. | |
| 2012/0033672 A1* | 2/2012 | Page | H04L 45/245 370/395.53 |
| 2013/0191517 A1* | 7/2013 | Ling | H04L 41/0859 709/220 |

(Continued)

FOREIGN PATENT DOCUMENTS

| | | |
|---|---|---|
| EP | 2696538 A1 | 2/2014 |
| WO | 2017/062671 A1 | 4/2017 |
| WO | 2017/070587 A1 | 4/2017 |

OTHER PUBLICATIONS

U.S. Appl. No. 15/229,012, filed Aug. 4, 2016 by Lin et al. (Unpublished.).

(Continued)

*Primary Examiner* — Siming Liu
(74) *Attorney, Agent, or Firm* — Stewart M. Wiener

(57) ABSTRACT

Techniques for determining port-to-port connectivity in an extended bridge are provided. According to one set of embodiments, a port extender (PE) of the extended bridge (e.g., a base PE) can build a local database comprising connectivity information for one or more physical cascade ports of the PE. This building can be based on one or more messages received from another PE in the extended bridge (e.g., a transit PE) that is directly connected to the PE. The PE can then transmit, at a time of joining the extended bridge, the connectivity information to a controlling bridge (CB) of the extended bridge for storage thereon.

17 Claims, 5 Drawing Sheets

(56) References Cited

U.S. PATENT DOCUMENTS

| | | | |
|---|---|---|---|
| 2014/0086098 A1* | 3/2014 | Ao | H04L 41/12 370/254 |
| 2014/0156906 A1 | 6/2014 | Babu et al. | |
| 2014/0181275 A1 | 6/2014 | Lin et al. | |
| 2014/0269710 A1 | 9/2014 | Sundaram et al. | |
| 2017/0085488 A1 | 3/2017 | Bhattacharya et al. | |
| 2017/0093628 A1 | 3/2017 | Lin et al. | |
| 2017/0104626 A1 | 4/2017 | Lin et al. | |
| 2017/0104665 A1 | 4/2017 | Gowthaman | |
| 2017/0104694 A1 | 4/2017 | Lin et al. | |
| 2017/0111296 A1 | 4/2017 | Agarwal et al. | |
| 2017/0118041 A1 | 4/2017 | Bhattacharya et al. | |
| 2017/0118042 A1 | 4/2017 | Bhattacharya et al. | |

OTHER PUBLICATIONS

U.S. Appl. No. 15/243,782, filed Aug. 22, 2016 by Ramesh Gowthaman (Unpublished.).

U.S. Appl. No. 15/272,218, filed Sep. 21, 2016 by Somen Bhattacharya (Unpublished.).

U.S. Appl. No. 15/276,579, filed Sep. 26, 2016 by Kwun-Nan Kevin Lin et al. (Unpublished.).

U.S. Appl. No. 15/276,619, filed Sep. 26, 2016 by Kwun-Nan Kevin Lin et al. (Unpublished.).

U.S. Appl. No. 15/286,472, filed Oct. 5, 2016 by Bipin Agarwal et al. (Unpublished.).

U.S. Appl. No. 15/331,067, filed Oct. 21, 2016 by Somen Bhattacharya et al. (Unpublished.).

U.S. Appl. No. 15/331,160, filed Oct. 21, 2016 by Somen Bhattacharya et al. (Unpublished.).

U.S. Appl. No. 15/489,395, filed Apr. 17, 2017 by Kwun-Nan Kevin Lin (Unpublished.).

Cisco IOS Command Modes; http://www.cisco.com/c/en/us/td/docs/ios/12_2/configfun/configuration/guide/ffun_c/fcf019.html#wp1000922; Mar. 25, 2016; 20 pages.

Dell C9010 Module Switch Interoperability with Cisco Catalyst 3750, A Development Guide for Dell Networking Switches (v1.0), Dell Network Solutions Engineering, Sep. 2015, 24 pages.

Dell Networking C1048P Getting Started Guide, Sep. 2015, 26 pages.

Juniper Networks, Junos Fusion Provider Edge, Release 14.2R4, Feb. 17, 2016, 646 pages.

Cisco StackWise and StackWise Plus Technology, 2016 Cisco, Mar. 25, 2016, 11 pages.

Dell Stack Master Election, Dell Networking Configuration Guide for the C9000 Series Version 9.9 (0.0), Mar. 25, 2016, 1 page.

Dell Networking Configuration Guide for the C9000 Series, Version 9.9 (0.0), Oct. 2015, 1148 pages.

International Search Report and Written Opinion for International Appln. No. PCT/US2016/055827 dated Jan. 25, 2017, 15 pages.

Virtual Bridged Local Area Networks-Bridge Port Extension, IEEE Computer Society, IEEE Std 802.1 BR-2012, Jul. 16, 2012, 121 pages.

Brocade FastIron Switch Port Extender, Configuration Guide, Supporting FastIron Software Release 8.0.40, Feb. 29, 2016, 88 pages.

International Search Report and Written Opinion for International Appln. No. PCT/US2016/058283 dated Feb. 17, 2017, 12 pages.

Lockwood et al., "Automated Tools to Implement and Test Internet Systems in Reconfigurable Hardware", ACM SIGCOMM Computer Communications Review, vol. 33, No. 3, Jul. 2003, pp. 103-110.

Cisco Nexus 5600 Series NX-OS Layer 2 Switching Configuration Guide, Release 7.x; Mar. 15, 2014; Cisco Systems, Inc.; 280 pages.

Configuring the Fabric Extender, Chapter 2; Cisco Nexus 2000 Series Fabric Extender Software Configuration Guide; 16 pages.

Configuring Port Extender Stack; Dell Networking C9010/C1048P; Jan. 30, 2017; https://qrl.dell.com/Files/enus/Html/C9010_C1048P/Configuring%20PE%20Stack.html; 3 pages.

Understanding Junos Fusion Provider Edge Components; Technical Documentation—Support—Juniper Networks; Mar. 31, 2017; 5 pages; https://www.juniper.net/documentation/en_US/junos/topics/concept/fusion-components.html.

\* cited by examiner

```
             active           standby
             +---+            +---+             +---+
      -2/1|  1  |2/4--2/4|  2  |2/1--2/1|  3  |2/4-
             +---+            +---+             +---+

DETERMINING PORT-TO-PORT CONNECTIVITY IN AN EXTENDED BRIDGE

CROSS-REFERENCES TO RELATED APPLICATIONS

The present application claims the benefit and priority of U.S. Provisional Patent Application No. 62/384,621, filed Sep. 7, 2016, entitled "DETERMINING PORT-TO-PORT CONNECTIVITY IN AN EXTENDED BRIDGE." The entire contents of this application are incorporated herein by reference for all purposes.

BACKGROUND

An extended bridge is a network topology that is based on the Institute of Electrical and Electronics Engineers (IEEE) 802.1BR standard and comprises two different types of units: a controlling bridge (CB) unit and one or more port extender (PE) units. The CB serves as the controller of the extended bridge and is responsible for performing control plane functions (e.g., Layer 2 switching, Layer 3 routing, etc.) with respect to network traffic that passes through the extended bridge. In contrast the PEs, which connect to the CB and to other network devices/hosts external to the extended bridge, act as non-intelligent devices and thus do not perform any local switching or routing; instead, their primary function is to provide additional data port terminations for the CB. For example, each PE may be a switch/router with X number of physical data ports, which appear as virtual data ports on the CB. Upon receiving a data packet from an external device/host on an ingress data port, the PE forwards the data packet to the CB, which processes the data packet in hardware and/or software to determine an appropriate egress port of the extended bridge through which the packet should be sent out. The CB then forwards the data packet to the PE housing the egress port for transmission through that port towards the next hop destination.

In some cases, an extended bridge may support multiple CBs which connect to each other according to a linear or ring topology. In these cases, one CB may be selected as the "master" CB of the extended bridge and serve as the central point of management for the entire bridge. Other CBs may operate in a "standby" or "member" mode.

The links that interconnect the PEs to each other and to the CB(s) in an extended bridge are known as cascade links. The ports at the endpoints of a cascade link are known as cascade ports. Cascade links are considered internal to the extended bridge since they only carry network traffic that has been tagged with a special ETAG header that is understood by the PEs and CB(s). The ETAG header facilitates the internal routing of traffic from an ingress PE to the CB(s) for processing, as well as from the CB(s) to the egress PE(s) that will forward the traffic out of the extended bridge. For example, in the case of routing a data packet from an ingress PE to a CB, the ETAG header will include an ECID (E-Channel ID) identifying the PE port through which the data packet was received. In the case of routing a data packet from a CB to an egress PE, the ETAG header will include an ECID identifying the PE port through which the data packet should be sent out.

A PE may connect directly to a CB or may connect indirectly to a CB via one or more intermediate (i.e., "transit") PEs. For example, multiple PEs may form a chain with one end, or both ends, connected to a CB. In the case where both ends of a PE chain are connected to a CB, the PE chain is referred to as a PE ring. Further, each endpoint of a cascade link may be a single physical port or a link aggregation group (LAG) that comprises multiple physical ports but is treated as a single logical port. In this latter case, the cascade link is also referred to as a cascade trunk.

One of the challenges of managing an extended bridge is keeping track of the physical connections between the PEs and CB(s) of the bridge. This can be particularly difficult if some of the PEs/CB(s) are interconnected using cascade trunks, since the CB(s) generally cannot distinguish the individual ports that are part of the cascade LAGs at the endpoints of each trunk (each LAG is identified using a single ECID). One manual approach for determining the port-to-port connections in an extended bridge is for a user to physically trace the cables between the bridge units. However, this manual approach is both time-consuming and error-prone, and thus is not practical in large-scale extended bridge deployments.

SUMMARY

Techniques for determining port-to-port connectivity in an extended bridge are provided. According to one set of embodiments, a port extender (PE) of the extended bridge (e.g., a base PE) can build a local database comprising connectivity information for one or more physical cascade ports of the PE. This building can be based on one or more messages received from another PE in the extended bridge (e.g., a transit PE) that is directly connected to the PE. The PE can then transmit, at a time of joining the extended bridge, the connectivity information to a controlling bridge (CB) of the extended bridge for storage thereon.

A further understanding of the nature and advantages of the embodiments disclosed herein can be realized by reference to the remaining portions of the specification and the attached drawings.

BRIEF DESCRIPTION OF THE DRAWINGS

FIG. 5 depicts an example representation of a bridge topology as output via the CLI of a master CB according to an embodiment.

DETAILED DESCRIPTION

In the following description, for purposes of explanation, numerous examples and details are set forth in order to provide an understanding of specific embodiments. It will be evident, however, to one skilled in the art that certain embodiments can be practiced without some of these details, or can be practiced with modifications or equivalents thereof.

1. Overview

Embodiments of the present disclosure provide techniques for automatically determining port-to-port connectivity in an extended bridge. Stated another way, these techniques enable the master CB of the extended bridge to identify and keep track of the individual physical ports that reside at the endpoints of each cascade link/trunk in the bridge. This port-to-port connectivity information may then be used for various purposes. For instance, according to one embodiment, the master CB can expose a command line interface (CLI) command that enables a user to view the topology of the extended bridge and port-level connections between the PEs and CB(s) as determined from the port-to-port connectivity information. This CLI command allows the user to easily visualize the bridge topology and plan cabling changes without having to physically trace the cables interconnecting the bridge units. According to another embodiment, the master CB can use the port-to-port connectivity information to more effectively validate dynamic cascade port/LAG changes.

2. Example Extended Bridge and Switch/Router Architecture

Figure 1:
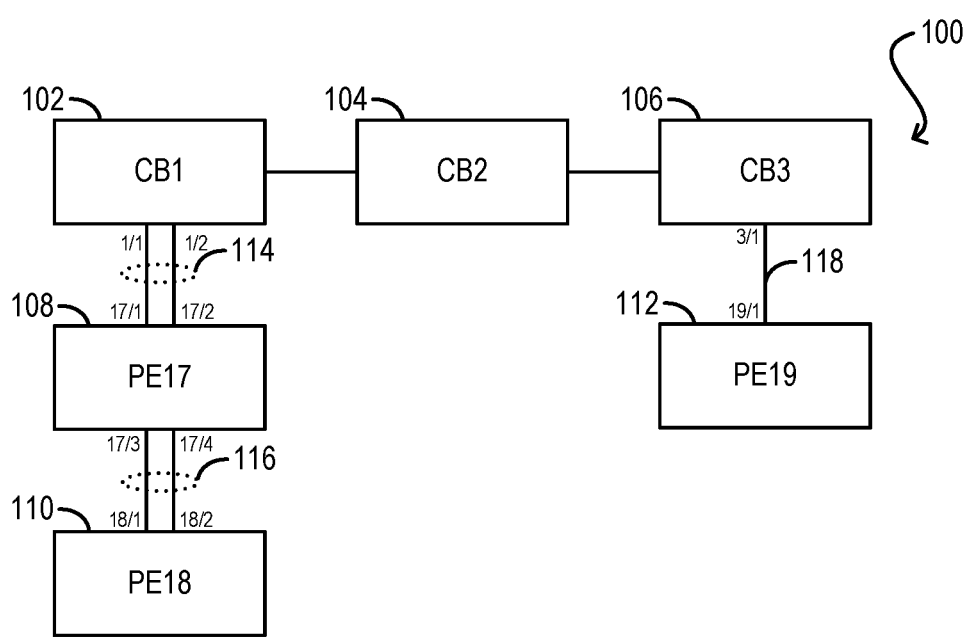
FIG. 1 depicts an example extended bridge according to an embodiment.

FIG. 1 is a simplified block diagram of an extended bridge 100 in which embodiments of the present disclosure may be implemented. As shown, extended bridge 100 includes three CBs 102, 104, and 106 (identified as CB1, CB2, and CB3) that are connected to each other to form a CB core stack. Each CB may be implemented using a relatively high-end switch/router that is capable of handling control plane functions (e.g., L2 forwarding, L3 routing, bridge management, etc.) for the entirety of extended bridge 100. For example, in one embodiment, each CB may be a high-cost, modular chassis-based switch/router.

Extended bridge 100 also includes three PEs 108, 110, and 112 (identified as PE17, PE18, and PE19) that are connected to the CBs and/or each other via cascade links 114, 116, and 118. Unlike the CBs, the PEs may be implemented using relatively lower-end switches/routers that are sufficient for carrying out PE functions as defined in the IEEE 802.1BR standard. For instance, in one embodiment each PE may be a lower-cost, "pizza box" style fixed-form factor switch/router.

In the example of FIG. 1, cascade link 114 between PE 108 (PE17) and CB 102 (CB1) and CB2) is a cascade trunk comprising two physical links. On the side of CB1, the two physical links are connected to a 2-port LAG comprising downstream ports 1/1 and 1/2. On the side of PE17, these two physical links are connected to a 2-port LAG comprising upstream ports 17/1 and 17/2. Either of the two physical links of the cascade trunk may be used to exchange ETAG traffic between CB1 and PE17.

Cascade link 116 between PE 108 (PE17) and PE 110 (PE18) is also a cascade trunk comprising two physical links. One the side of PE17, these two physical links are connected to a 2-port LAG comprising downstream ports 17/3 and 17/4. On the side of PE18, the two physical links are connected to a 2-port LAG comprising upstream ports 18/1 and 18/2. Either of the two physical links of the cascade trunk may be used to exchange ETAG traffic between PE17 and PE18.

The other cascade link in extended bridge 100 (i.e., cascade link 118) is a non-LAG link—in other words, a link with a single physical port at each endpoint of the link.

Figure 2:
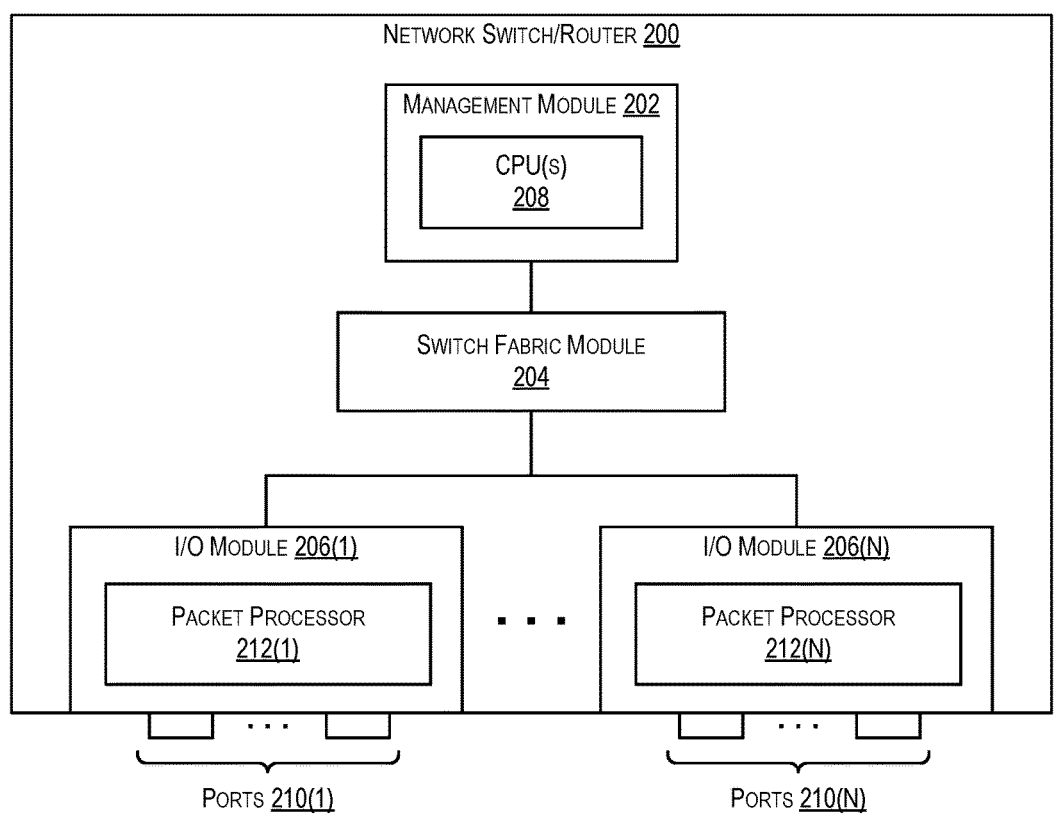
FIG. 2 depicts an example switch/router architecture according to an embodiment.

FIG. 2 depicts the architecture of an example switch/router 200 that may be used to implement the CBs or PEs of FIG. 1 according to an embodiment. As shown in FIG. 2, switch/router 200 comprises a management module 202, a switch fabric module 204, and one or more I/O modules 206(1)-(N). Management module 202 includes one or more management CPUs 208 for managing/controlling the operation of switch/router 200. Each management CPU 208 can be a general purpose processor, such as a PowerPC, Intel, AMD, or ARM-based processor, that operates under the control of software stored in an associated volatile memory (e.g., RAM) 210 and/or nonvolatile memory (e.g., ROM, flash memory, etc.) 212.

Switch fabric module 204 and I/O module(s) 206(1)-(N) collectively represent the data, or forwarding, plane of switch/router 200. Switch fabric module 204 is configured to interconnect the various other modules of switch/router 200. Each I/O module 206(1)-(N) includes one or more ports 214(1)-(N) that are used by switch/router 200 to send and receive data packets to/from other networks/hosts, as well as to/from other units within extended bridge 100 of FIG. 1. Each I/O module 206(1)-(N) also includes a packet processor 216(1)-(N) that can make wire speed decisions on how to handle incoming or outgoing data packets.

As noted in the Background section, one of the challenges of managing an extended bridge such as extended bridge 100 of FIG. 1 involves keeping track of the physical port-to-port connections between the PEs and CB(s) of the bridge. Generally speaking, existing extended bridges cannot determine this information in an automated manner because, in the case where the extended bridge includes one or more cascade trunks (as in FIG. 1), the master CB cannot distinguish/differentiate the physical ports that are part of the cascade LAGs at the endpoints of each trunk.

To address this problem, each of the PEs and CBs in extended bridge 100 can be enhanced to include novel port connectivity logic (not shown). In one embodiment, this logic can be implemented in software via, e.g., program code that is executed by a management CPU of each unit (e.g., management CPU 208). In other embodiments, this logic can be implemented in hardware or a combination of software and hardware.

At a high level, the port connectivity logic of each PE and CB can enable these units to work in concert to automatically determine port-to-port connectivity information for the cascade (i.e., CB-PE and PE-PE) links of extended bridge 100. In cases where a given cascade link is a single port-to-port link, the port-connectivity information can include the IDs of the single cascade ports on either side of the cascade link. In the case where a given cascade link is a cascade trunk, the port-to-port connectivity information can include the IDs of the cascade ports that are part of the LAG on either side of the trunk, as well as the specific connections between these individual ports. For instance, the following is an example listing of port-to-port connectivity information that may be determined for extended bridge 100 of FIG. 1:

---
Listing 1

Link 1: lag, # of ports = 2
    1: 1/1  <---> 17/1
    2: 1/2  <---> 17/2
Link 2: lag, # of ports = 2
    1: 17/3 <---> 18/1
    2: 17/4 <---> 18/2
Link 3: link, # of ports = 1
    1: 3/1  <---> 19/1

---

Once this port-to-port connectivity information has been determined, it can be aggregated/maintained on the master CB of the extended bridge and thereafter used for various purposes. For example, in one embodiment, the master CB can expose a CLI command or other user interface that enables a user/administrator to view a visual representation of the bridge topology that includes all of the physical port-level connections in the extended bridge. In another embodiment, the master CB can leverage the port-to-port connectivity information to perform more intelligent validation of dynamic cascade port/LAG changes. These and other aspects are described in further detail in the sections that follow.

It should be appreciated that FIGS. 1 and 2 are illustrative and not intended to limit embodiments of the present disclosure. For example, although FIG. 1 depicts a particular topology for extended bridge 100, any other type of topology may be used. Further, the various entities shown in FIGS. 1 and 2 may have additional subcomponents or functions that are not described. One of ordinary skill in the art will recognize many variations, modifications, and alternatives.

3. Workflows for Determining Port-to-Port Connectivity

Generally speaking, the process for determining port-to-port connectivity information within an extended bridge can differ depending on whether the connectivity is between a PE and a CB (i.e., the PE is directed attached to the CB) or between two PEs (i.e., a base PE attached to a transit PE). Each of these cases is described below.

3.1 PE Directly Attached to CB

In the scenario where a PE is directed attached to a CB, the CB will generally know the physical port-to-port connections between the CB and PE by virtue of the ETAG header information included in data traffic received from the PE. For example, assume CB1 of FIG. 1 receives a data packet from PE17 on CB1 port 1/1. In this case, CB1 can inspect the source port header field of the data packet and determine that the packet originated from port 17/1 of PE17. Thus, CB1 can conclude that CB1 port 1/1 is connected to PE17 port 17/1. Similarly, if CB1 receives a data packet from PE17 on CB1 port 1/2, CB1 can determine from the source port header field that the data packet originated from port 17/2 of PE17 and thereby conclude that CB1 port 1/2 is connected to PE17 port 17/2.

In some cases, a PE may be directly attached to a standby CB, which is in turn connected to a master CB. In these cases, the master CB may not be able to directly determine the port-to-port connections between the standby CB and the PE based on ETAG header information. For instance, in FIG. 1, assume CB2 is the master CB of the extended bridge and CB3 is a standby CB. In this scenario, PE19 will transmit a data packet to CB3, which will in turn forward the packet to CB2. However, since the packet is first received on CB3, CB2 cannot easily determine the port of CB3 on which the packet was originally received from PE19.

To overcome this, in certain embodiments the native source module and native source port is passed between CBs and this information can be used to identify the original CB port on which the data traffic was received. With this new data, the master CB can resolve the original CB RX (receiving) port and thus determine port-to-port connectivity info between the standby CB and its directly connected PEs. For instance, returning to the example above, if standby CB3 receives a data packet from PE19, CB3 can populate the native source module and port fields on which the packet was received (i.e., 3/1) and then forward the data packet to master CB2. CB2 can then inspect these fields to resolve the port-to-port connectivity between standby CB3 and PE19.

3.2 Base PE Attached to Transit PE

In the scenario where a base PE is attached to a transit PE, a different process may be used for determining port-to-port connectivity information between the base PE and the transit PE. An example of this process is shown as workflow 300 in FIG. 3.

Starting with block 302, at the time of joining the extended bridge, the transit PE can send a message out of each of its physical cascade ports for the purpose for relaying port connectivity information to its directly connected PE(s). For example, assume that the transit PE is PE17 of FIG. 1. In this example, PE17 can broadcast the message on its cascade ports 17/3, and 17/4, which causes the message to be received by base PE18. In one embodiment, the message can be a Link Layer Discovery Protocol (LLDP) join message. In other embodiments, the message can be, e.g., a inter-process communication (IPC) message.

At block 304, the base PE can receive the message(s) transmitted at block 302 on each of its cascade ports that is connected to the transit PE. For example, base PE18 can receive one copy of the message on PE18 port 18/1 and can receive another copy of the message on PE18 port 18/2. Note that the base PE can perform this receiving step regardless of whether the base PE has already joined the extended bridge or not.

At block 306, the base PE can determine, based on the source port information included in the received message(s), the port-to-port connectivity for each RX cascade port. For instance, base PE18 can inspect the source port field for the message received on port 18/1, determine that the source port is PE17 port 17/3, and thus conclude that 18/1 is connected to 17/3. Similarly, base PE18 can inspect the source port field for the message received on port 18/2, determine that the source port is PE17 port 17/4, and thus conclude that 18/2 is connected to 17/4. Upon determining this port-to-port connectivity information, the base PE can store the information in a local port connectivity database (block 308).

Then, at the time of sending its next join message to the master CB, the base PE can include all of the port-to-port connectivity information for its physical cascade ports (as stored in the local port connectivity database) in the join message (block 310). For instance, returning to the example above, base PE18 can include in its join message an indication that PE18 port 18/1 is connected to PE17 port 17/3 and PE18 port 18/2 is connected to PE17 port 17/4. PE18 may also include an indication that ports 18/1 and 18/2 are part of a single cascade LAG.

Finally, at block 312, the master CB can receive the join message transmitted at block 310 and store the port-to-port connectivity information included in the message in its own port connectivity database. Note that this workflow can be executed by every PE in the extended bridge, thereby enabling the master CB to aggregate and maintain port-to-port connectivity information for the entirety of the bridge.

Figure 3:
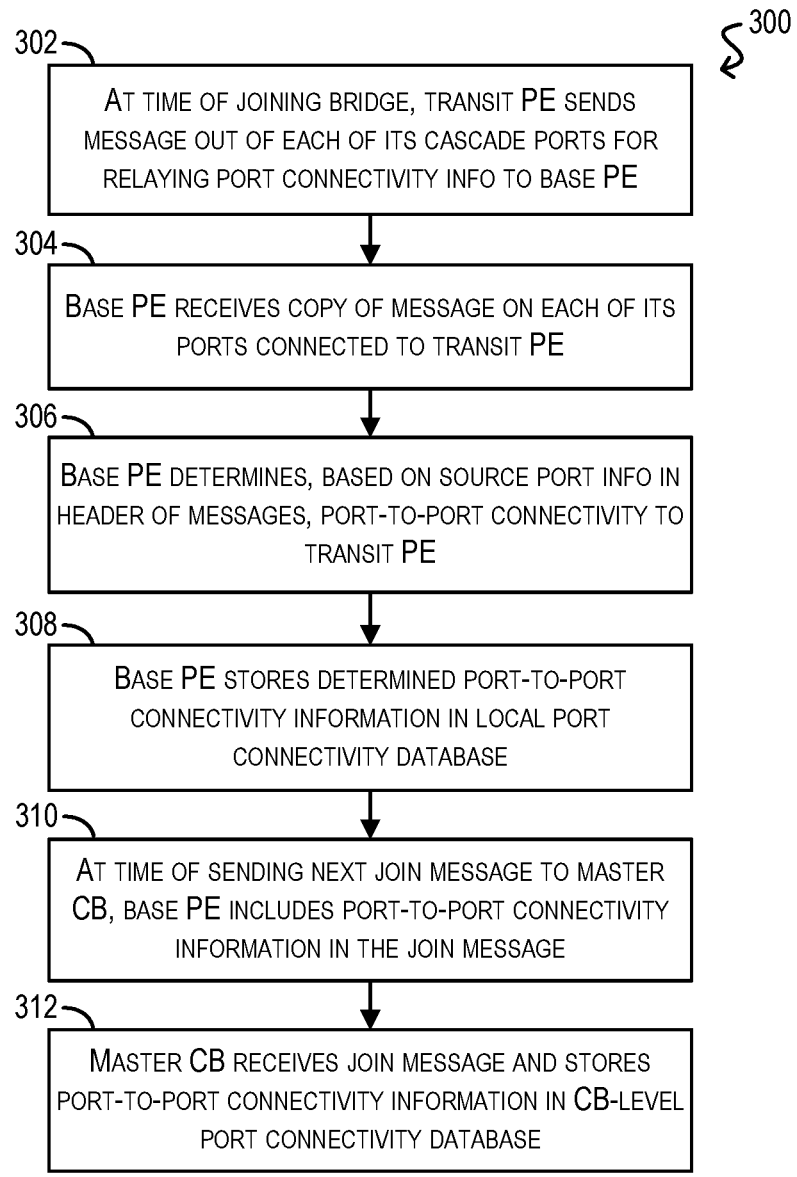
FIG. 3 depicts a workflow for determining port-to-port connectivity between a base PE and a transit PE according to an embodiment.

It should be appreciated that workflow 300 of FIG. 3 is illustrative and various modifications are possible. For example, although not shown, in certain embodiments each PE can continue to send additional LLDP join messages to the master CB on a periodic basis (i.e., after joining the bridge) with up-to-date port connectivity information. This allows the master CB to keep its port connectivity database current. In some cases, the transmission of these additional "update" messages may require too much processing power for the PEs. In these cases, each PE may be limited to collecting up-to-date connectivity port information for a fixed number of cascade ports that meet predefined criteria (e.g., four ports with highest utilization in transmit direction, three ports with highest number of receive errors, etc.). The PE can collect data/statistics regarding these ports every X number of seconds and transmit the update message to the master CB. One of ordinary skill in the art will recognize other variations, modifications, and alternatives.

4. Displaying Port-to-Port Connections

As mentioned previously, upon aggregating the port-to-port connectivity information for an extended bridge, the master CB of the bridge can use/leverage this information for various purposes. In one set of embodiments, the master CB can expose a CLI command or other similar user interface for presenting, in a visual format, the topology of the extended bridge (including the port-to-port connections captured in the port connectivity database). For example, assume that port connectivity database includes the following information:

```
                          Listing 2
    Link   1: lag, # of ports = 2
           1: 1/1/1  <---> 17/2/1
           2: 2/1/1  <---> 17/2/2
    Link   2: lag, # of ports = 2
           1: 17/1/1 <---> 18/1/47
           2: 17/1/2 <---> 18/1/48
    Link   3: lag, # of ports = 2
           1: 1/1/5  <---> 19/2/1
           2: 2/1/5  <---> 19/2/2
```

In this case, upon invoking the CLI command, the master CB can output a visual representation of the bridge topology: as shown in FIG. 5.

In certain embodiments, upon receiving an invocation of the CLI command, the master CB can send out a probe message on all cascade links in order to probe the current bridge topology. The PEs that are directly connected to the core CB stack can receive the probe message and forward the message to the next PE in their respective PE chains. This can repeat until all PEs in the extended bridge have received the probe message.

When each PE receives the probe message, the PE can set a flag in its local port connectivity database for the cascade port on which it received the probe. At a later point in time, when the PE sends an LLDP join message to the CB, if this flag is set, a corresponding probe bit can set in the join message.

The master CB can collect the connectivity information in the join messages it receives if the probe bit is set. After a timeout period, the master CB can assume that it has received all the probe information and can display the connectivity information to the user. In addition, the probe flag can be cleared on the master CB and all PEs after the probe timeout period.

5. Validating Cascade Port/LAG Changes

Figure 4:
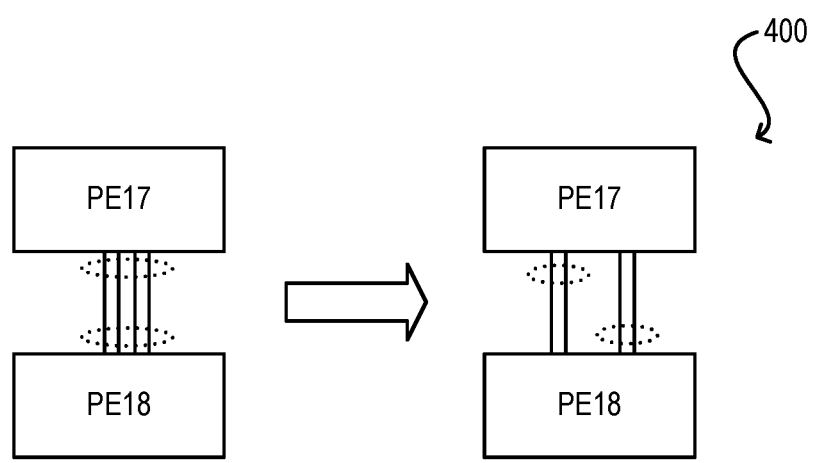
FIG. 4 depicts a change to a cascade LAG according to an embodiment.

In addition to providing a CLI command/UI for visualizing the bridge topology, the master CB can also leverage the port-to-port-connectivity information for performing more intelligent validation of dynamic cascade port/LAG changes. For example, consider the scenario shown in FIG. 4 where two PEs (PE17 and PE18) are connected via a cascade trunk that comprises a 4-port LAG on each side of the trunk. Assume that a user attempts to modify the LAG configurations on PE17 and PE18 such that the first two downstream ports of PE17 are modified into a 2-port LAG and the last two upstream ports of PE18 are modified into another 2-port LAG. This change will effectively cause PE18 to lose communication with PE17 and the rest of the extended bridge, since the downstream LAG interface of PE17 is no longer connected to the upstream LAG interface of PE18. Previously, the CB could not identify this type of error because the CB was unaware of which ports were connected on each side of a cascade trunk. However, with the detailed port-to-port connectivity information described in the present disclosure, the CB can identify the problem depicted with the LAG change shown in FIG. 4 and thus prevent this change from occurring.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. For example, although certain embodiments have been described with respect to particular process flows and steps, it should be apparent to those skilled in the art that the scope of the present invention is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

The specification and drawings are, accordingly, to be regarded in an illustrative rather than restrictive sense. Other arrangements, embodiments, implementations and equivalents will be evident to those skilled in the art and may be employed without departing from the spirit and scope of the invention as set forth in the following claims.

What is claimed is:

1. A method comprising:
   building, by a port extender (PE) in an extended bridge, a local database comprising connectivity information for a plurality of physical cascade ports of the PE, wherein the building is based, at least in part, on one or more messages received from another PE in the extended bridge that is directly connected to the PE via a cascade trunk including two or more of the plurality of physical cascade ports, and wherein the connectivity information includes:
      an indication of the cascade trunk;
      identities of the two or more physical cascade ports in the cascade trunk; and
      identities of two or more other physical cascade ports on said another PE that are directly connected to the two or more physical cascade ports in the cascade trunk; and
   transmitting, by the PE at a time of joining the extended bridge, the connectivity information to a controlling bridge (CB) of the extended bridge.

2. The method of claim 1 wherein said another PE is a transit PE situated between the PE and the CB.

3. The method of claim 1 wherein the one or more messages are Link Layer Discovery Protocol (LLDP) messages.

4. The method of claim 1 wherein the one or more messages are inter-process communication (IPC) messages.

5. The method of claim 1 wherein the one or more messages are received at a time said another PE joins the extended bridge.

6. The method of claim 1 wherein the PE receives one message on each of the two or more physical cascade ports in the cascade trunk.

7. The method of claim 1 wherein the PE determines the connectivity information based on header information included in the one or more messages.

8. The method of claim 1 wherein the CB is configured to use the connectivity information for validating dynamic cascade port or link aggregation group (LAG) changes in the extended bridge.

9. The method of claim 1 wherein the CB is configured to use the connectivity information to display a topology of the extended bridge to a user.

10. A non-transitory computer readable storage medium having stored thereon program code executable by a port extender (PE) in an extended bridge, the program code causing the PE to:
- build a local database comprising connectivity information for a plurality of physical cascade ports of the PE, wherein the building is based, at least in part, on one or more messages received from another PE in the extended bridge that is directly connected to the PE via a cascade trunk including two or more of the plurality of physical cascade ports, and wherein the connectivity information includes:
  - an indication of the cascade trunk;
  - identities of the two or more physical cascade ports in the cascade trunk; and
  - identities of two or more other physical cascade ports on said another PE that are directly connected to the two or more physical cascade ports in the cascade trunk; and
- transmit, at a time of joining the extended bridge, the connectivity information to a controlling bridge (CB) of the extended bridge.

11. The non-transitory computer readable storage medium of claim 10 wherein said another PE is a transit PE situated between the PE and the CB.

12. The non-transitory computer readable storage medium of claim 10 wherein the one or more messages are received at a time said another PE joins the extended bridge.

13. The non-transitory computer readable storage medium of claim 10 wherein the PE determines the connectivity information based on header information included in the one or more messages.

14. A port extender (PE) for use in an extended bridge, the PE comprising:
- a processor; and
- a non-transitory computer readable medium having stored thereon program code that, when executed by the processor, causes the processor to:
  - build a local database comprising connectivity information for a plurality of physical cascade ports of the PE, wherein the building is based, at least in part, on one or more messages received from another PE in the extended bridge that is directly connected to the PE via a cascade trunk including two or more of the plurality of physical cascade ports, and wherein the connectivity information includes:
    - an indication of the cascade trunk;
    - identities of the two or more physical cascade ports in the cascade trunk; and
    - identities of two or more other physical cascade ports on said another PE that are directly connected to the two or more physical cascade ports in the cascade trunk; and
  - transmit, at a time of joining the extended bridge, the connectivity information to a controlling bridge (CB) of the extended bridge.

15. The PE of claim 14 wherein said another PE is a transit PE situated between the PE and the CB.

16. The PE of claim 14 wherein the one or more messages are received at a time said another PE joins the extended bridge.

17. The PE of claim 14 wherein the PE determines the connectivity information based on header information included in the one or more messages.

* * * * *